Figure 1:
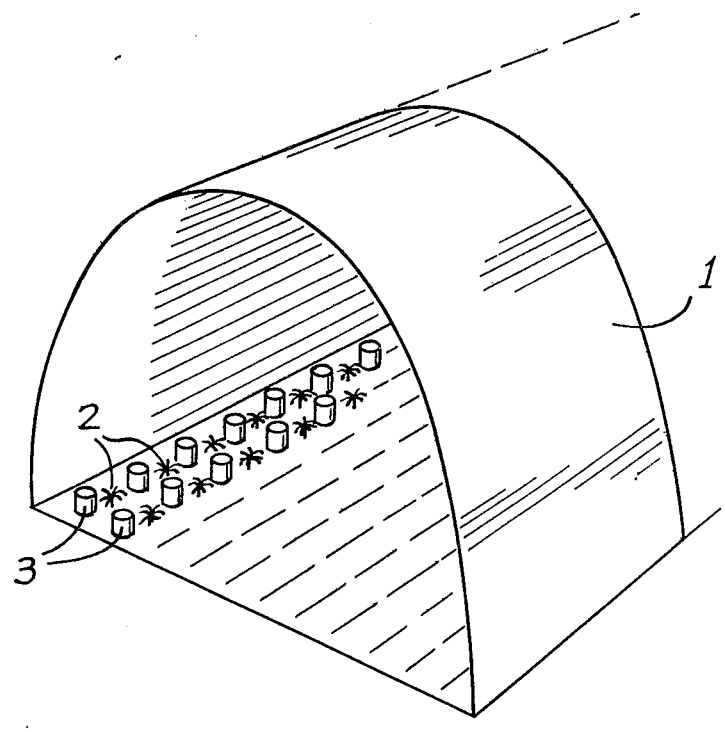

United States Patent [19]

Chabanon et al.

[11] 4,244,148
[45] Jan. 13, 1981

[54] PROCESS AND DEVICE FOR AIR-CONDITIONING GREENHOUSES

[75] Inventors: Francoise M. Chabanon, Roquefort-les-Pins; Henri J. Royer, Nice, both of France

[73] Assignee: Association pour la Recherche et le Developpement des Methodes et Processus Industriels (A.R.M.I.N.E.S.), Paris, France

[21] Appl. No.: 25,400

[22] Filed: Mar. 30, 1979

[30] Foreign Application Priority Data

Apr. 5, 1978 [FR] France ............................... 78 10703

[51] Int. Cl.³ .......................... A01G 9/00; C09K 3/18
[52] U.S. Cl. ...................................... 47/58; 126/400; 126/900; 165/DIG. 17; 252/70; 47/17
[58] Field of Search ................... 47/17, 58; 126/400, 126/900; 165/DIG. 17; 252/70

[56] References Cited

FOREIGN PATENT DOCUMENTS 508922 10/1930 Fed. Rep. of Germany .
1568245 4/1969 France .

OTHER PUBLICATIONS

Lightweight Thermal Storage . . . , Johnson, Solar Energy, Pergamon Press, 1971, vol. 19, No. 6, pp. 669–675.
Proc. Solar Energy Workshop, Jensen, Univ. of Ariz., Apr. 5–6, 1976, pp. 201–202 cited.
Designing and Building . . . , Watson, 1977, Garden Way Publishing, Charlotte, Vt., pp. 76–77 cited.

Primary Examiner—Robert E. Bagwill
Attorney, Agent, or Firm—Bucknam and Archer

[57] ABSTRACT

The invention relates to a process for air-conditioning a greenhouse or the like for the cultivation of plants, due to the solar energy which is picked up during the day, wherein isothermic containers are disposed inside the greenhouse, which contain a body of which the melting temperature is between 10° and 20° C., so that, during the day, when the temperature inside the greenhouse exceeds said melting temperature, said body melts, absorbing calories and cooling the atmosphere of the greenhouse and, during the night, when the temperature becomes lower than said melting temperature, said body solidifies, releasing the latent heat of solidification.

4 Claims, 2 Drawing Figures

U.S. Patent

Jan. 13, 1981

4,244,148

PROCESS AND DEVICE FOR AIR-CONDITIONING GREENHOUSES

The present invention relates to processes and static devices for air-conditioning green-houses or the like in which plants are cultivated.

Numerous greenhouses and the like for the cultivation of plants, for example of flowers or lettuces, are intended solely to protect these plants from frost during the cold hours of the night. Greenhouses are often set up in sunny climates, for example in the Mediterranean region, and during the sunny hours, the temperature inside the greenhouse reaches and exceeds 30° C. and the greenhouse must be ventilated.

Greenhouse air-conditioning devices are already known which comprise solar pick-ups having a selective absorbent power or shafts placed on the ground in which a cold heat-carrying liquid is made to circulate during the day in order to air-condition the interior of the greenhouse whilst recovering heat which is accumulated in a storage tank and which is used during the night to heat the greenhouse.

These installations are relatively complex. They comprise circulation pumps, storage tanks, regulating means, shafts or pickups and auxiliary heating means such as boiler or heat pump.

It is an object of the present invention to provide much simpler, entirely static means which enable the interior of the greenhouse to be maintained at a temperature higher than 0° C., i.e. to ensure that the plants are not affected by frost for a temperature difference with the outside of the order of 10° C., due to the heat which is recovered on the spot during the sunny hours, this enabling, at the same time, the interior of the greenhouse to be cooled during the day.

This aim is attained by means of a process for air-conditioning a greenhouse or the like for the cultivation of plants, due to the solar energy which is picked up during the day, according to which process isothermic containers are placed inside the greenhouse, which contain a body of which the melting temperature is between 10° C. and 20° C., so that during the day, when the temperature inside the greenhouse exceeds said melting temperatue, said body melts, absorbing calories and cooling the atmosphere of the greenhouse and, during the night, when the temperature inside the greenhouse becomes lower than the melting temperature, said body solidifies, releasing the latent heat of solidification.

Small containers are preferably distributed over the whole surface of the greenhouse, each containing hydrated sodium hydroxide NaOH, $3,5H_2O$ of which the melting temperature is 15° C.

In this case, each container further contains a fragment of an agent nucleating the sodium hydroxide, preferably a fragment of sodium dichromate, which is separated from the liquid phase by a liquid-permeable screen which is placed near a wall of the container.

A static device according to the invention comprises sealed containers which contain hydrated sodium hydroxide Na OH, $3,5H_2O$ and which are distributed over the whole surface of the greenhouse at a rate of about 5 to 20 liters per m². Each of these containers contains a small fragment of sodium chromate.

According to a variant embodiment, each of the containers contains a liquid-permeable pad, for example a pad of felt, fibres or cellular material and a small fragment of sodium dichromate placed in said pad.

The result of the invention is the air-conditioning of the greenhouses by means of an entirely static installation which is inexpensive as far as investment, functioning or maintenance are concerned, so that the cost price of the plants cultured in greenhouses air-conditioned by the process according to the invention bears very low heating costs.

The choice of the hydrated sodium hydroxide Na OH, $3,5H_2O$ for this application constitutes a feature of the invention. In fact, the melting temperature of this hydroxide, which is 15° C., is particularly suitable. During the night, it suffices to maintain in the greenhouse a temperature of the order of +5° C. to air-condition the greenhouse. The isothermic containers containing the hydroxide which has melted during the day remain at the constant temperature of 15° C. as long as some liquid phase remains in the containers.

When the temperature in the greenhouse becomes of the order of 5° C., the temperature difference with the isothermic stores is 10° C. and the power of heat exchange through the walls of the containers suffices to compensate the losses of heat through the walls of the greenhouse for a temperature difference of the order of 10° C., i.e. for an outside temperature of the order of −5° C. which is that usually met with in Mediterranean climates.

During the day, the temperature in the greenhouse generally exceeds 30° C., the temperature difference with the isothermic store is therefore also +15° C. and the exchange of calories through the walls of the containers is effected under good conditions, this enabling solar energy to be recovered and the rise in temperature inside the greenhouse to be limited, and thus avoids the ventilation which is effected with conventional greenhouses and which presents the drawback of eliminating the carbon dioxide which the plants need in photosynthesis.

Of course, a temperature of +15° C. for the isothermic containers is not imperative and other bodies may therefore be used having a slightly different melting temperature, for example bodies having a melting temperature of between +10° C. and +20° C.

The choice of hydrated sodium hydroxide presents another advantage due to the fact that is is a so-called congruent hydrate, i.e. when all the hydroxide has melted, no solid precipitate is produced in the liquid phase. In fact, in the case of non-congruent salts or hydrates which produce, by melting, a liquid phase which may contain a solid precipitate, when the liquid phase must solidify to yield the latent heat of solidification, the speed of the liquid-solid conversion is considerably braked by the existence of a solid precipitate and the calorific power of the store risks being insufficient, this possibly leading to a drop in temperature in the greenhouse to below 0° C. This risk of accident cannot be produced with the hydrated sodium hydroxide Na OH, $3,5H_2O$ as this hydroxide is congruent.

Another cause of poor functioning of an isothermic calorie store which furnishes calories corresponding to the latent heat of solidification of the liquid phase is the phenomenon of superfusion, i.e. the persistence of the liquid phase when the temperature drops to below the melting temperature.

It is known that the superfusion may be remedied by adding in each store a fragment of a nucleating agent which is a body having a higher melting temperature and a crystalline lattice very close to that of the body of which it is desired to avoid superfusion, so that it constitutes a type of crystallisation by epitaxy. For example, for the hydrated sodium hydroxide, sodium chromate is used as nucleating agent, According to a feature of the invention, a small fragment of a few grams of sodium dichromate $Na_2Cr_2O_7$, $2H_2O$ which is converted into sodium chromate $Na_2CrO_4$, $4H_2O$, is placed in each container. This chromate serves as nucleating agent. It may or may not be placed behind a screen permeable to the liquid phase. In this latter case, the nucleating agent must be in a proportion greater than its solubility in the hydrated sodium hydroxide. The minimum proportion of chromate to be introduced is about 3% by weight.

By way of example and without any limiting character, a greenhouse is considered, set up in the Mediterranean region having for example a ground surface of 100 mm$^2$ and a volume of 300 m$^3$. It is assumed that the vertical walls and the roof of this greenhouse are constituted by glass having a thickness of 4 mm, i.e. a coefficient K of calorie transmission equal to 5.7 W/m$^2$/0° C. for the vertical walls and 6.6 W/m$^2$/0° C. for the horizontal walls. Calculations have shown that the overall coefficient G of calorific loss of such a greenhouse is $G = 3.5$ W/m$^3$/0° C.

Isothermic containers are placed inside this greenhouse, for recovering calories by latent heat of fusion, containing hydrated sodium hydroxide NaOH, 3,5H$_2$O, of which the melting temperature is 15° C. and of which the latent heat of fusion is 70 KWH/m$^3$.

It is desired to avoid that the temperature in the greenhouse drops during the night to below $+5°$ C. for a temperature difference with the outside of $+10°$ C., i.e. for a minimum outside temperature of $-5°$ C. which corresponds to the minimum temperatures generally recorded in Mediterranean climates.

The maximum power to be furnished will therefore, under the extreme conditions, be $3.5 \times 300$ m$^3 \times 10° = 10.5$ KWH.

During the night, the extreme temperature conditions last about two hours and it is estimated that the total energy is of the order of that which corresponds to a full-power functioning for 4 hours, or a total of 42 KW/day.

A store of the order of 0.6 m$^3$ for 100 m$^2$ of greenhouse, or about 6 liters per m$^2$, must therefore be disposed in the whole of the greenhouse.

However, to ensure the independent functioning of the airconditioning as a function of the climatic conditions (for example insufficient periods of sunshine for several days running), the characteristics of the greenhouse (according to the nature of the roof, the height) and according to the type of plants cultivated, it is provided to have available a volume of hydroxide greater than the lower threshold of 6 liters per m$^2$. Between 5 and 20 liters per m$^2$ of ground surface of the greenhouse will preferably be stored.

Sodium hydroxide being corrosive, it is placed in containers made of plastics material and they are closed hermetically to avoid any risk of loss of sodium hydroxide and of burning the plants or persons moving in the greenhouse.

However, it is not sufficient to have a sufficient storage capacity; it is also necessary that the heat-exchange surface be sufficient to obtain, with a temperature difference of 10° C. between the isothermic containers and the atmosphere of the greenhouse, the total power of 55 KW which is necessary under the extreme temperature conditions.

Calculations have shown that this condition may be fulfilled with containers made of plastics material having a unitary volume of 2 to 3 liters, which are placed on the ground and distributed uniformly between the plants at a rate of 5 to 10 containers of 1 to 3 liters per m$^2$ of surface. The fact of placing the containers on the ground presents the advantage of heating the ground and the atmosphere at plant level. A temperature is thus maintained in the immediate vicinity of the plants, which is higher, by a few degrees, than the temperature prevailing in the volume of the greenhouse, this enabling low-lying plants such as lettuces or certain flowers, to be maintained frost-free.

Moreover, the fact that not only the atmosphere, but also the ground around the plants is heated, has beneficial effects for the cultivation of certain plants.

Of course, the sodium hydroxide may be placed in containers made of a material which resists corrosion and which has a better coefficient of heat exchange K than the plastics materials, this enabling the ratio of exchange surface/volume to be reduced and a smaller number of containers of larger volume to be used, for example 1 to 3, 5 to 10- liter containers per m$^2$. However, the 2 to 3-liter plastics containers present the advantage of constituting inexpensive containers, which resist corrosion.

FIG. 1 schematically shows a portion of greenhouse 1 comprising rows of plants 2, between which are disposed 2 to 3-liter cans or bottles 3 made of plastics material, containing hydrated sodium hydroxide NaOH, 3,5H$_2$O, at a rate of 5 to 10 bottles per m$^2$.

Figure 2:
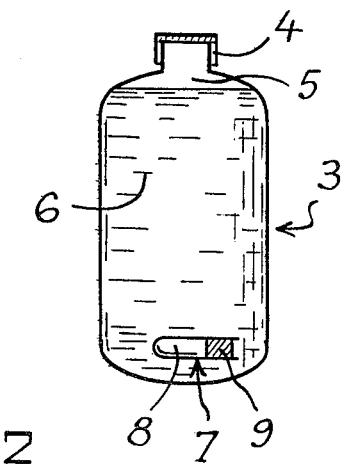

FIG. 2 shows a bottle 3, which is hermetically sealed by a cap 4 and which is filled, except for an air-bubble 5 to allow for expansion, with sodium hydroxide 6. This bottle contains a test-tube 7 or other enclosure open at one end. In the bottom of this tube is placed a fragment 8 of a few grams of sodium dichromate converting, on contact with the solution, into sodium chromate. The tube 7 is closed by a stopper 9 which is permeable to the liquid 6, so that, when the liquid cools to 15° C., a nucleus of crystal of hydrated sodium hydroxide NaOH 3,5H$_2$O is formed in contact with the fragment 8 which is a nucleating agent. The crystal grows and passes through the stopper 9 which is impregnated with liquid 6 and the crystallisation propagates rapidly along the walls of the bottle 3, which are colder. The liquid phase which is confined in the tube 7 behind the stopper 9 is rapidly saturated with sodium chromate, so that it suffices to place a few grams of this body 8 in the tube 7 for a solid fragment of the body 8 to remain.

The stopper 9 is for example a stopper made of felt, fibres, cellular material, for example a foam or a porous membrane. As a variant, the enclosure 7 may be eliminated and a fragment 8 may be placed in a pad 9 made of fibrous or cellular material.

In another embodiment (not shown), a few grams of sodium dichromate $Na_2Cr_2O_7$, $2H_2O$, are disposed at the bottom of each container containing the hydrated sodium hydroxide NaOH, 3, 5H$_2$O, without any protection and are converted into $Na_2CrO_4$, $4H_2O$, nucleating agent. In this case, it is necessary to introduce a minimum proportion of chromate of 3% by mass.

What is claimed is:

1. A process for air-conditioning a greenhouse or the like for the cultivation of plants by means of heat from the sun which consists of placing within the greenhouse a plurality of portable isothermic closed containers, each container having a unit volume of 1–10 liters, each container containing a body of a material having latent heat of fusion, the melting temperature of said body of material being between 10° and 20° C., uniformly distributing said containers in the interior of the greenhouse at a rate of 5–10 containers per $m^2$ of ground surface, whereby during the day when the temperature inside the greenhouse due to the heat from the sun exceeds said melting temperature, said body of material melts, absorbing calories and cooling the interior of said greenhouse and during the night when the temperature in the greenhouse becomes lower than said melting temperature, said body of material solidifies and releases by solidification the latent heat of fusion.

2. The process of claim 1, wherein said material is a sodium hydrate and each container further contains a small fragment of an agent for nucleating the sodium hydrate.

3. The process of claim 2 wherein said body of material having latent heat of fusion is hydrated sodium hydroxide NaOH, $3.5H_2O$ of melting temperature 15° C. and said nucleating agent is $Na_2CrO_4, 4H_2O$.

4. The process of claims 2 or 3 wherein said nucleating agent is placed behind a screen.